United States Patent
Yang et al.

(10) Patent No.: US 8,395,596 B2
(45) Date of Patent: Mar. 12, 2013

(54) TOUCH PANEL DEVICE HAVING HIGH TOUCH SENSITIVITY AND TOUCH POSITIONING METHOD THEREOF

(75) Inventors: Jun-Wei Yang, Hsin-Chu (TW);
Chia-Feng Yang, Hsin-Chu (TW);
Yu-Min Hsu, Hsin-Chu (TW);
Yung-Tse Cheng, Hsin-Chu (TW)

(73) Assignee: AU Optronics Corp., Science-Based Industrial Park, Hsin-Chu (TW)

(*) Notice: Subject to any disclaimer, the term of this patent is extended or adjusted under 35 U.S.C. 154(b) by 750 days.

(21) Appl. No.: 12/641,297

(22) Filed: Dec. 17, 2009

(65) Prior Publication Data
US 2011/0037708 A1    Feb. 17, 2011

(30) Foreign Application Priority Data
Aug. 11, 2009  (TW) .............................. 98126930 A

(51) Int. Cl.
*G06F 3/045*  (2006.01)
(52) U.S. Cl. ..................................... 345/174; 178/18.06
(58) Field of Classification Search .................. 345/174; 178/18.06
See application file for complete search history.

(56) References Cited

U.S. PATENT DOCUMENTS

| | | | |
|---|---|---|---|
| 4,893,124 A | 1/1990 | Tsuji | |
| 6,856,259 B1 | 2/2005 | Sharp | |
| 2007/0247172 A1 | 10/2007 | Li | |
| 2007/0268272 A1 | 11/2007 | Perski | |
| 2008/0012835 A1 | 1/2008 | Rimon | |
| 2008/0023232 A1* | 1/2008 | Morag et al. ............... | 178/19.01 |

* cited by examiner

*Primary Examiner* — Adam R Giesy
(74) *Attorney, Agent, or Firm* — Winston Hsu; Scott Margo

(57) ABSTRACT

A touch panel device having high touch sensitivity includes sensing capacitors, switches, storage capacitors, a differential amplifier and a signal processing unit. During a sense period, the switches are periodically turned on alternately for periodically transferring the charges of the sensing capacitors to the storage capacitors. The differential amplifier is put in use for amplifying the voltage difference of two corresponding storage capacitors for generating a touch readout signal. The signal processing unit performs an OR operation on two touch readout signals generated during different sense periods based on different sensing capacitor combinations regarding same panel touch position for providing a touch position signal.

21 Claims, 7 Drawing Sheets

TOUCH PANEL DEVICE HAVING HIGH TOUCH SENSITIVITY AND TOUCH POSITIONING METHOD THEREOF

BACKGROUND OF THE INVENTION

1. Field of the Invention

The present invention relates to a touch panel device and a touch positioning method thereof, and more particularly, to a touch panel device having high touch sensitivity and a touch positioning method thereof.

2. Description of the Prior Art

Along with the requirement of a friendly communication interface for a user to interact with an electronic device, a touch panel for controlling operations of the electronic device by directly touching the panel with fingers, instead of using a keyboard or a mouse, has gained popularity. In general, touch panels are primarily classified into the resistive touch panels and the capacitive touch panels. The resistive touch panel positions a touched position according to related voltage drops changing in response to the touched position. The capacitive touch panel normally comprises a plurality of sensing capacitors, and the touched position can be positioned by analyzing the changing of capacitance of the sensing capacitor corresponding to the touched position.

FIG. 1 is a structural diagram schematically showing a prior-art touch panel device 100. As shown in FIG. 1, the touch panel device 100 includes a touch panel 101, a plurality of sensing lines 110, a plurality of sensing capacitors 120, a plurality of storage capacitors 140, and a plurality of comparators 150. Each sensing capacitor 120 can be an equivalent capacitor of one corresponding sensing line 110. When the touch panel 101 is touched, the capacitance of a sensing capacitor 120 corresponding to touched position increases accordingly and, in turn, a power source Vdd will furnish more charges to a corresponding sensing line 110 for boosting the capacitor voltage of a corresponding storage capacitor 140. The capacitor voltage of the corresponding storage capacitor 140 is then compared with a reference voltage Vref by a corresponding comparator 150 for generating a touch readout signal. However, if the size of a touch panel is larger, the equivalent capacitance of each sensing line is greater, which results in a lower variation regarding the capacitor voltage of one storage capacitor corresponding to a touch event. That is, regarding a prior-art touch panel device, touch sensitivity is lower with larger touch panel size.

SUMMARY OF THE INVENTION

In accordance with one embodiment of the present invention, a touch panel device having high touch sensitivity is provided. The touch panel device comprises a touch panel, a first sensing capacitor, a first switch, a second switch, a first storage capacitor, a third switch, a second sensing capacitor, a fourth switch, a fifth switch, a second storage capacitor, a sixth switch, and a differential amplifier.

The first sensing capacitor is disposed in the touch panel. The first switch, electrically connected to the first sensing capacitor, is utilized for controlling an electrical connection between the first sensing capacitor and a power source. The second switch is electrically connected to the first sensing capacitor. The first storage capacitor is electrically connected to the second switch and functions to accumulate charges transferred from the first sensing capacitor so as to generate a first voltage when the second switch is turned on. The third switch, electrically connected to the first storage capacitor, is utilized for controlling an operation of discharging the charges accumulated in the first storage capacitor. The second sensing capacitor is disposed in the touch panel. The fourth switch, electrically connected to the second sensing capacitor, is utilized for controlling an electrical connection between the second sensing capacitor and the power source. The fifth switch is electrically connected to the second sensing capacitor. The second storage capacitor is electrically connected to the fifth switch and functions to accumulate charges transferred from the second sensing capacitor so as to generate a second voltage when the fifth switch is turned on. The sixth switch, electrically connected to the second storage capacitor, is utilized for controlling an operation of discharging the charges accumulated in the second storage capacitor. The differential amplifier, electrically connected to the first storage capacitor and the second storage capacitor, is employed to generate a touch readout signal through performing a differential amplification operation on the first and second voltages.

In accordance with another embodiment of the present invention, a touch panel device having high touch sensitivity is provided. The touch panel device comprises a touch panel, a first sensing capacitor, a second sensing capacitor, a third sensing capacitor, a fourth sensing capacitor, a first differential amplifier, a second differential amplifier, a first switch, a second switch, a third switch, and a fourth switch.

The first through fourth sensing capacitors are disposed in the touch panel. The first differential amplifier comprises a first input end electrically connected to the first sensing capacitor, a second input end, and an output end for outputting a first touch readout signal. The second differential amplifier comprises a first input end, a second input end electrically connected to the fourth sensing capacitor, and an output end for outputting a second touch readout signal. The first switch comprises a first end electrically connected to the second sensing capacitor and a second end electrically connected to the second input end of the first differential amplifier. The second switch comprises a first end electrically connected to the third sensing capacitor and a second end electrically connected to the second input end of the first differential amplifier. The third switch comprises a first end electrically connected to the second sensing capacitor and a second end electrically connected to the first input end of the second differential amplifier. The fourth switch comprises a first end electrically connected to the third sensing capacitor and a second end electrically connected to the first input end of the second differential amplifier.

The present invention further provides a touch positioning method for use in a touch panel device for enhancing touch sensitivity. The touch panel device has plural sensing elements disposed at plural panel positions respectively. The touch positioning method comprises generating a plurality of first touch readout signals through sequentially scanning plural sets of two adjacent sensing elements, generating a plurality of second touch readout signals through sequentially scanning plural sets of two sensing elements spaced out at least one sensing element, generating a plurality of third touch readout signals through performing an OR operation on the first and second readout signals corresponding to each panel position of the touch panel device, performing a touch position analyzing operation on the third touch readout signals for generating at least one touch position signal, and outputting the at least one touch position signal.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto. Furthermore, the step serial numbers regarding the touch positioning method are not meant thereto limit the operating sequence, and any rearrangement of the operating sequence for achieving same functionality is still within the spirit and scope of the invention.

Figure 1:
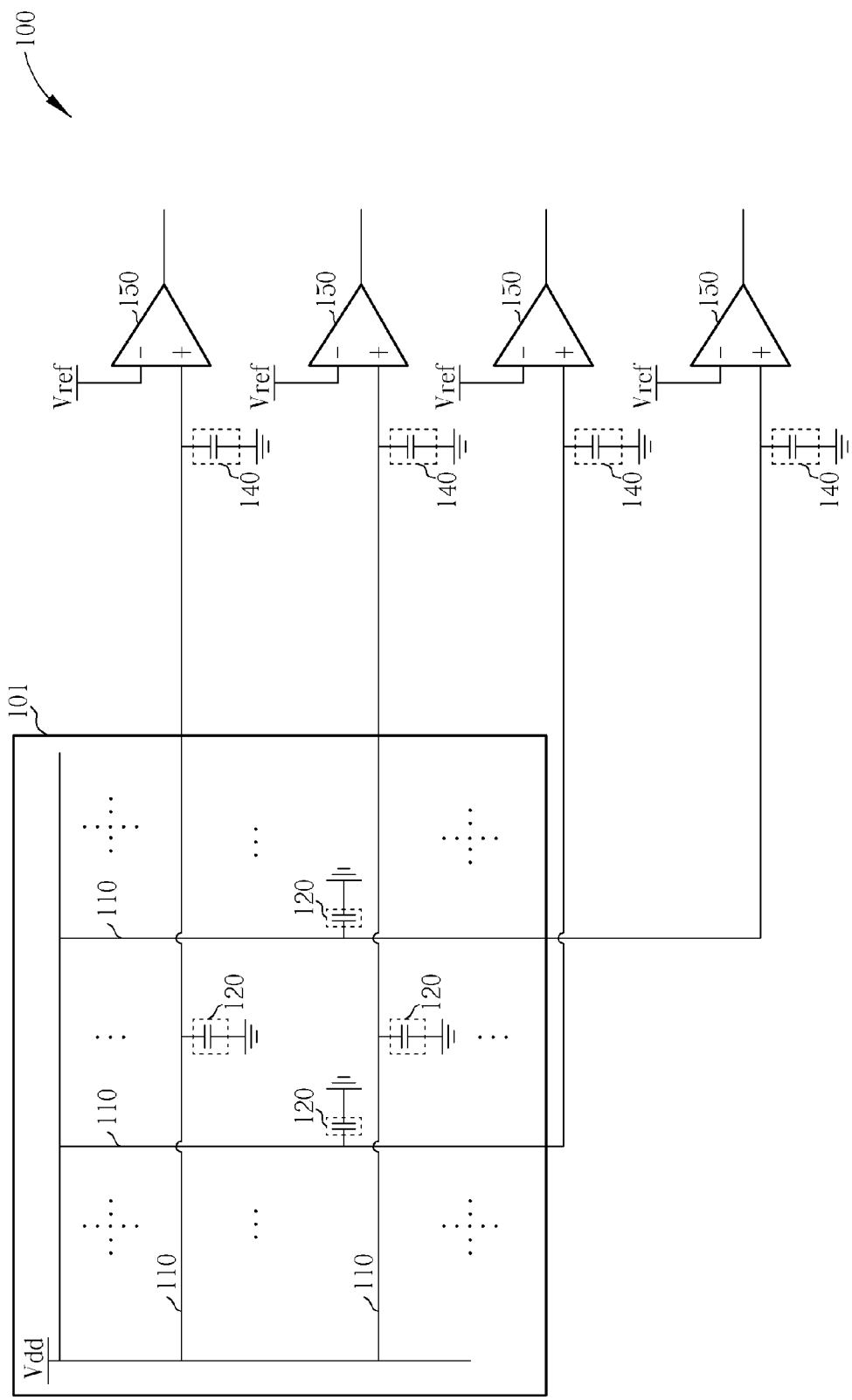
FIG. 1 is a structural diagram schematically showing a prior-art touch panel device.
Figure 2:
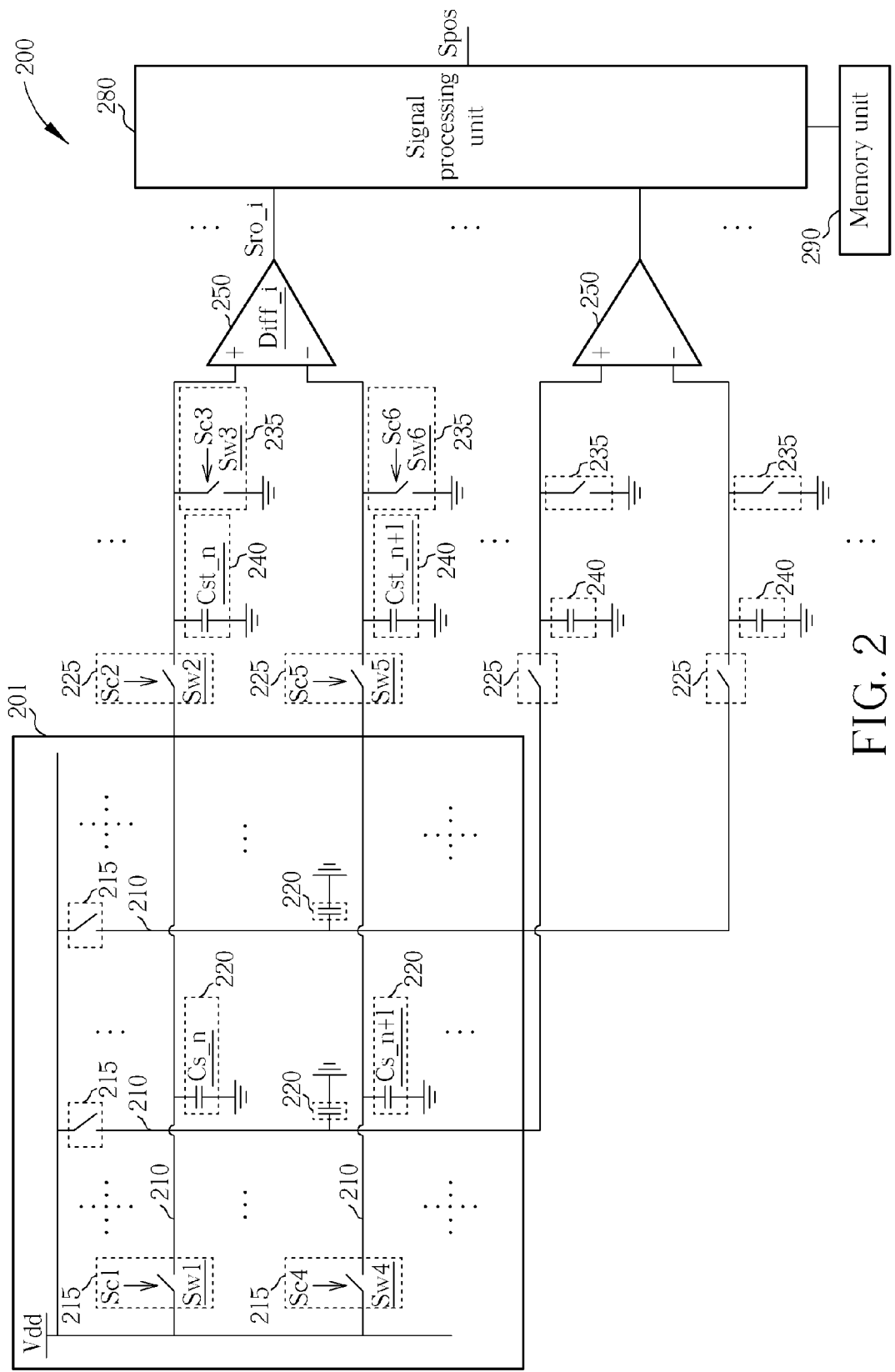
FIG. 2 is a structural diagram schematically showing a touch panel device in accordance with a first embodiment of the present invention.

FIG. 2 is a structural diagram schematically showing a touch panel device 200 in accordance with a first embodiment of the present invention. As shown in FIG. 2, the touch panel device 200 comprises a touch panel 201, a plurality of sensing lines 210, a plurality of sensing capacitors 220, a plurality of first switches 215, a plurality of second switches 225, a plurality of storage capacitors 240, a plurality of third switches 235, a plurality of differential amplifiers 250, a signal processing unit 280, and a memory unit 290. The sensing lines 210 and the sensing capacitors 220 are disposed in the touch panel 201. Each sensing capacitor 220 can be an equivalent capacitor of one corresponding sensing line 210. The sensing lines 210 include plural horizontal sensing lines and plural vertical sensing lines. And the vertical sensing lines are crossed with the horizontal sensing lines. Each first switch 215 is employed to control an electrical connection between a power source Vdd and one corresponding sensing capacitor 220. Each second switch 225 is employed to control an electrical connection between one corresponding sensing capacitor 220 and one corresponding storage capacitor 240. Each third switch 235 is employed to control a discharging operation for releasing the accumulated charges of one corresponding storage capacitor 240. Each differential amplifier 250 is put in use for generating one corresponding touch readout signal through amplifying the difference between capacitor voltages of two corresponding storage capacitors electrically connected to the positive and negative input ends thereof. The touch readout signals generated by the differential amplifiers 250 are forwarded to the signal processing unit 280. The signal processing unit 280 performs analog/digital conversion operations on the touch readout signals for generating a plurality of digital readout signals. Furthermore, the signal processing unit 280 performs logic operations and touch position analyzing operations on the digital readout signals for providing at least one touch position signal Spos. The memory unit 290, electrically connected to the signal processing unit 280, is utilized for storing the digital readout signals.

For instance, the first switch Sw1, electrically connected to the sensing capacitor Cs_n and the power source Vdd, functions to control an electrical connection between the sensing capacitor Cs_n and the power source Vdd according to a first control signal Sc1. The first switch Sw4, electrically connected to the sensing capacitor Cs_n+1 and the power source Vdd, functions to control an electrical connection between the sensing capacitor Cs_n+1 and the power source Vdd according to a first control signal Sc4. The second switch Sw2, electrically connected to the sensing capacitor Cs_n and the storage capacitor Cst_n, functions to control an electrical connection between the sensing capacitor Cs_n and the storage capacitor Cst_n according to a second control signal Sc2. The second switch Sw5, electrically connected to the sensing capacitor Cs_n+1 and the storage capacitor Cst_n+1, functions to control an electrical connection between the sensing capacitor Cs_n+1 and the storage capacitor Cst_n+1 according to a second control signal Sc5.

The third switch Sw3, electrically connected to the storage capacitor Cst_n, is used to control a discharging operation for releasing the accumulated charges of the storage capacitor Cst_n according to a third control signal Sc3. The third switch Sw6, electrically connected to the storage capacitor Cst_n+1, is used to control a discharging operation for releasing the accumulated charges of the storage capacitor Cst_n+1 according to a third control signal Sc6. The differential amplifier Diff_i comprises a positive input end electrically connected to the storage capacitor Cst_n, a negative input end electrically connected to the storage capacitor Cst_n+1, and an output end for outputting a touch readout signal Sro_i to the signal processing unit 280. In one embodiment, the sensing capacitors Cs_n and Cs_n+1 are adjacent sensing capacitors 220. In another embodiment, the sensing capacitors Cs_n and Cs_n+1 are spaced out at least one sensing capacitor 220.

Figure 3:
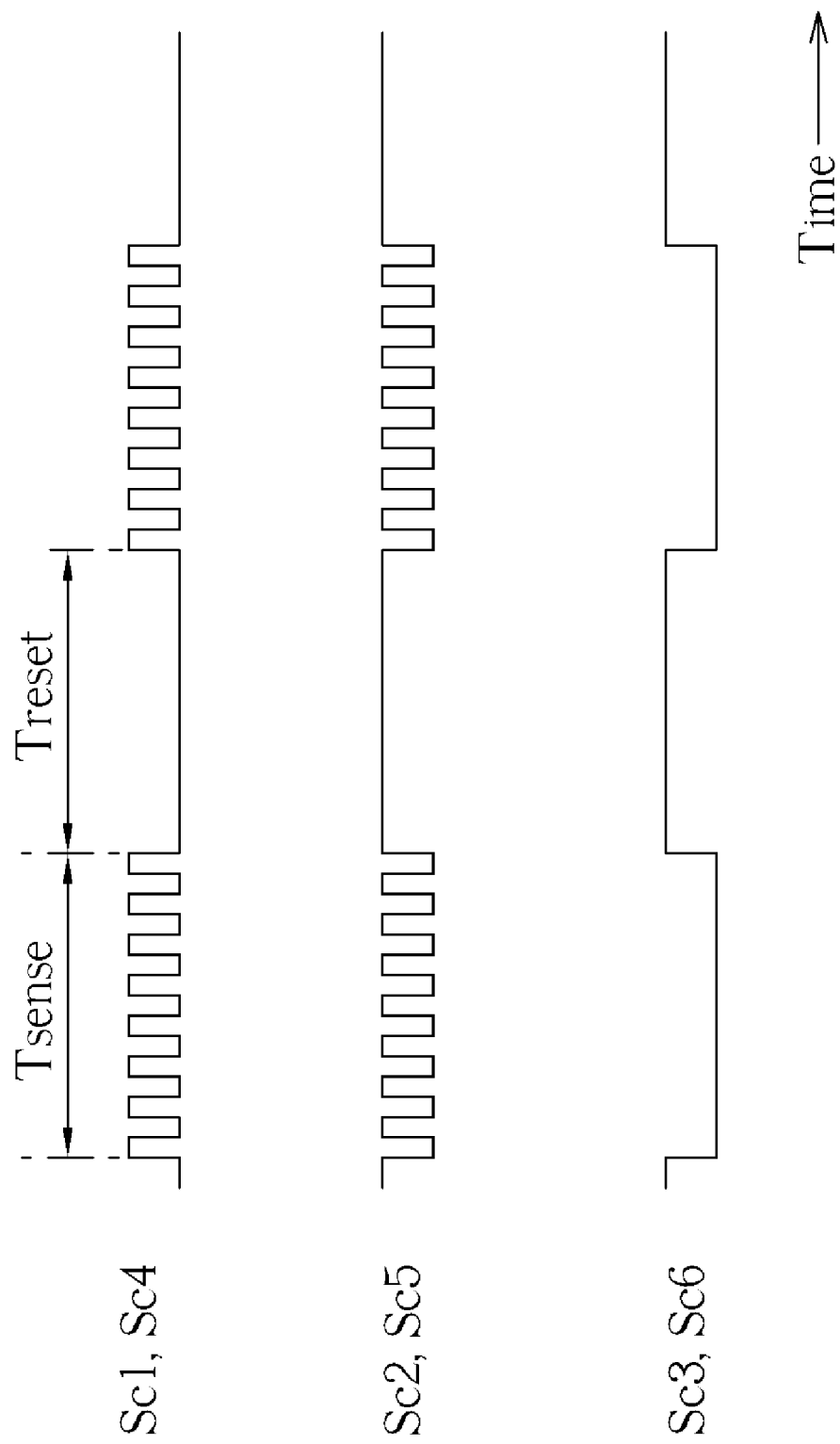
FIG. 3 is a schematic diagram showing related signal waveforms regarding the operation of the touch panel device in FIG. 2, having time along the abscissa.

FIG. 3 is a schematic diagram showing related signal waveforms regarding the operation of the touch panel device 200 in FIG. 2, having time along the abscissa. The signal waveforms in FIG. 3, from top to bottom, are the first control signals Sc1, Sc4, the second control signals Sc2, Sc5, and the third control signals Sc3, Sc6. As shown in FIG. 3, during a sense period $T_{sense}$, the third control signals Sc3 and Sc6 are turn-off signals for turning off the third switches Sw3 and Sw6. In the meantime, the first control signal Sc1 and the second control signal Sc2 are clock signals having phases opposite to each other. Consequently, the first switch Sw1 and the second switch Sw2 are periodically turned on (closed) alternately for periodically transferring the charges of the sensing capacitor Cs_n to the storage capacitor Cst_n. Similarly, the first control signal Sc4 and the second control signal Sc5 are clock signals having phases opposite to each other. Consequently, the first switch Sw4 and the second switch Sw5 are periodically turned on alternately for periodically transferring the charges of the sensing capacitor Cs_n+1 to the storage capacitor Cst_n+1. For that reason, when the panel position corresponding to the sensing capacitor Cs_n is touched, the storage capacitor Cst_n is able to effectively accumulate more charges for generating higher capacitor voltage so that the differential amplifier Diff_i is capable of providing the touch readout signal Sro_i having high sensitivity.

During a reset period $T_{reset}$, the first control signals Sc1 and Sc4 are turn-off signals for turning off the first switches Sw1 and Sw4. Meanwhile, the second control signals Sc2, Sc5 and the third control signals Sc3, Sc6 are turn-on signals for turning on the second switches Sw2, Sw5 and the third switches Sw3, Sw6. Accordingly, all the charges stored in the sensing capacitors Cs_n, Cs_n+1 and the storage capacitors Cst_n, Cst_n+1 are released. In another embodiment, during the reset period $T_{reset}$, the second control signals Sc2 and Sc5 are turn-off signals for turning off the second switches Sw2, Sw5 so that only the charges stored in the storage capacitors Cst_n, Cst_n+1 are released.

Figure 4:
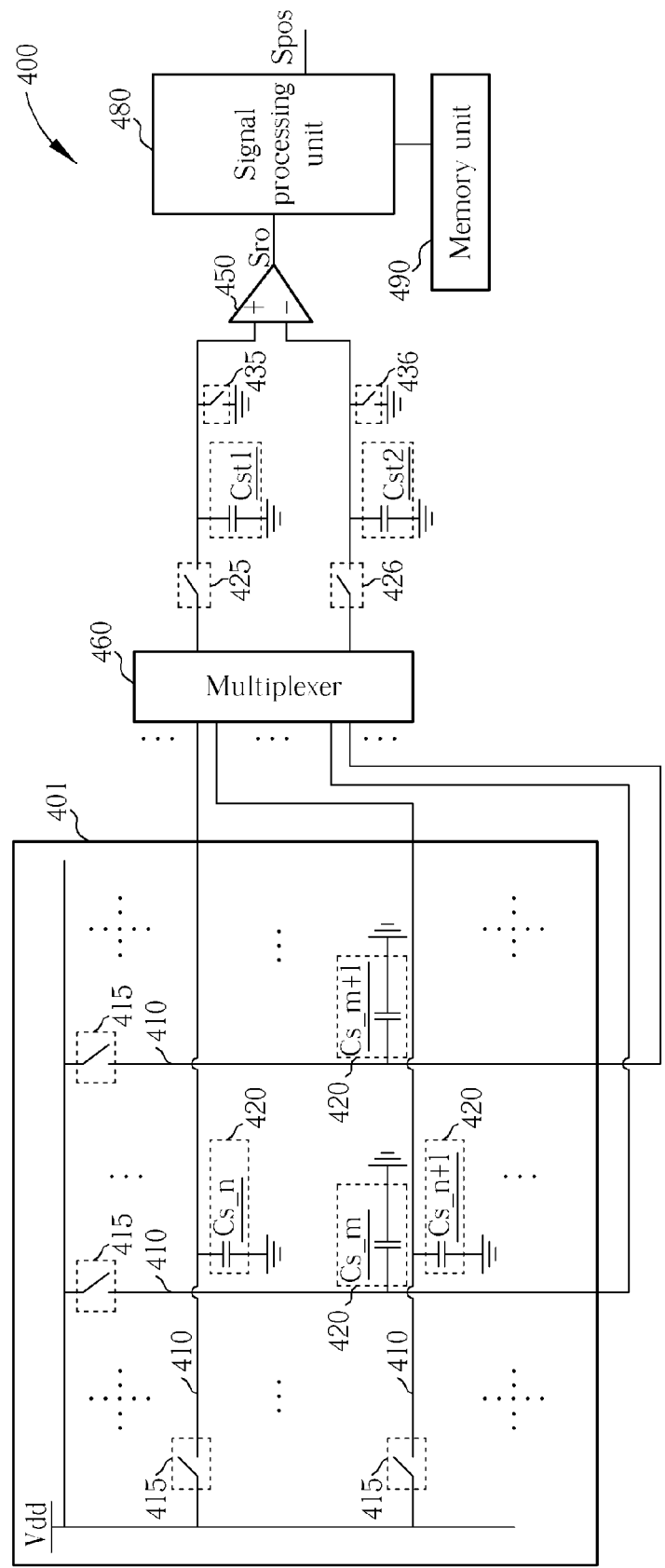
FIG. 4 is a structural diagram schematically showing a touch panel device in accordance with a second embodiment of the present invention.

FIG. 4 is a structural diagram schematically showing a touch panel device 400 in accordance with a second embodiment of the present invention. As shown in FIG. 4, the touch panel device 400 comprises a touch panel 401, a plurality of sensing lines 410, a plurality of sensing capacitors 420, a plurality of first switches 415, a multiplexer 460, a second switch 425, a third switch 426, a first storage capacitor Cst1, a second storage capacitor Cst2, a fourth switch 435, a fifth switch 436, a differential amplifier 450, a signal processing unit 480, and a memory unit 490. The sensing lines 410 and the sensing capacitors 420 are disposed in the touch panel 401. Each sensing capacitor 420 can be an equivalent capacitor of one corresponding sensing line 410. The multiplexer 460 comprises a plurality of input ends, a first output end electrically connected to the second switch 425, and a second output end electrically connected to the third switch 426. Each input end of the multiplexer 460 is electrically connected to one corresponding sensing capacitor 420. The differential amplifier 450 comprises a positive input end electrically connected to the first storage capacitor Cst1, a negative input end electrically connected to the second storage capacitor Cst2, and an output end for outputting a touch readout signal Sro to the signal processing unit 480. The second switch 425 is electrically connected between the first output end of the multiplexer 460 and the positive input end of the differential amplifier 450. The third switch 426 is electrically connected between the second output end of the multiplexer 460 and the negative input end of the differential amplifier 450. The fourth switch 435 is electrically connected between the positive input end of the differential amplifier 450 and ground terminal. The fifth switch 436 is electrically connected between the negative input end of the differential amplifier 450 and ground terminal.

The sensing capacitors 420 are divided into plural sets of two sensing capacitors 420. The two sensing capacitors 420 of each set are adjacent or spaced out at least one sensing capacitor 420. The multiplexer 460 is employed to sequentially connect each set of two sensing capacitors 420 to the second switch 425 and the third switch 426. That is, when the second switch 425 is turned on, the multiplexer 460 transfers the charges of the sensing capacitor Cs_n, the sensing capacitor Cs_m or the other corresponding sensing capacitor 420 to the first storage capacitor Cst1 via the first output end thereof. Similarly, when the third switch 426 is turned on, the multiplexer 460 transfers the charges of the sensing capacitor Cs_n+1, the sensing capacitor Cs_m+1 or the other corresponding sensing capacitor 420 to the second storage capacitor Cst2 via the second output end thereof.

When the touch panel device 400 is operating in a sense period, the second switch 425 and one corresponding first switch 415 electrically connected to the second switch 425 via the multiplexer 460 are periodically turned on alternately so that the first storage capacitor Cst1 is able to periodically accumulate the charges transferred from one corresponding sensing capacitor 420. In the meantime, the third switch 426 and another corresponding first switch 415 electrically connected to the third switch 426 via the multiplexer 460 are periodically turned on alternately so that the second storage capacitor Cst2 is able to periodically accumulate the charges transferred from another corresponding sensing capacitor 420. During each sense period, it is noted that the sensing lines 410, which are electrically connected neither to the second switch 425 nor to the third switch 426 via the multiplexer 460, can be grounded or electrically connected to a reference level. When the touch panel device 400 is operating in a reset period, the second switch 425, the third switch 426, the fourth switch 435 and the fifth switch 436 are all turned on for releasing the charges stored in the first storage capacitor Cst1, the second storage capacitor Cst2 and two corresponding sensing capacitors 420 electrically connected to the second switch 425 and the third switch 426 via the multiplexer 460. Meanwhile, two corresponding first switches 415 electrically connected to the second switch 425 and the third switch 426 via the multiplexer 460 are turned off (opened). In another embodiment, during the reset period, the second switch 425 and the third switch 426 are turned off so that only the charges stored in the first storage capacitor Cst1 and the second storage capacitor Cst2 are released.

The signal processing unit 480 is electrically connected to the differential amplifier 450 and functions to perform analog/digital conversion operations on plural touch readout signals Sro sequentially generated during different sense periods for generating a plurality of digital readout signals. Furthermore, the signal processing unit 480 performs logic operations and touch position analyzing operations on the digital readout signals for providing at least one touch position signal Spos. In one embodiment, the signal processing unit 480 is employed to perform an OR operation on two digital readout signals generated during two sense periods based on different sets of two sensing capacitors regarding same panel touch position for providing the touch position signal Spos accordingly. The memory unit 490, electrically connected to the signal processing unit 480, is utilized for storing the digital readout signals.

Compared with the touch panel device 200 shown in FIG. 2, although the multiplexer 460 is further added to the touch panel device 400, the touch panel device 400 includes merely the single differential amplifier 450, two storage capacitors Cst1, Cst2, two switches 425, 426 for charge transferring operations, and two switches 435, 436 for discharging operations. Besides, the signal processing unit 480 includes only the single input end for receiving the touch readout signal Sro provided by the differential amplifier 450. In view of that, the circuit structure of the touch panel device 400 is significantly simplified to bring the cost down. Also, with the aid of the multiplexer 460, the charge transferring operation regarding the sensing capacitors 420 of the touch panel 401 is more flexible for successfully detecting various touch events.

Figure 5:
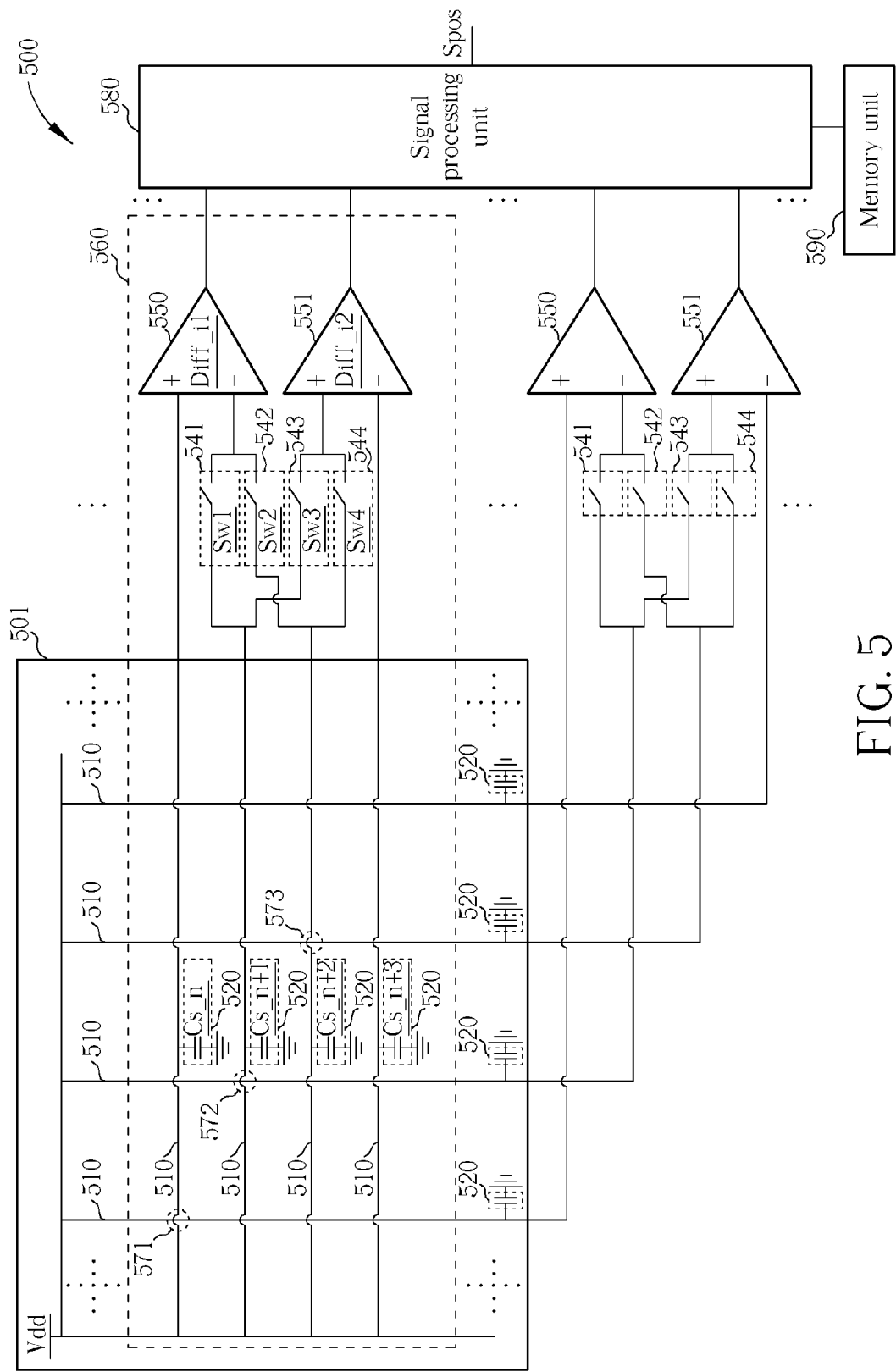
FIG. 5 is a structural diagram schematically showing a touch panel device in accordance with a third embodiment of the present invention.

FIG. 5 is a structural diagram schematically showing a touch panel device 500 in accordance with a third embodiment of the present invention. As shown in FIG. 5, the touch panel device 500 comprises a touch panel 501, a plurality of sensing lines 510, a plurality of sensing capacitors 520, a plurality of first switches 541, a plurality of second switches 542, a plurality of third switches 543, a plurality of fourth switches 544, a plurality of first differential amplifiers 550, a plurality of second differential amplifiers 551, a signal processing unit 580, and a memory unit 590. The sensing lines 510 and the sensing capacitors 520 are disposed in the touch panel 501. All the sensing lines 510 are electrically connected directly to a power source Vdd. Each sensing capacitor 520 is charged by the power source Vdd for generating a capacitor voltage via one corresponding sensing line 510. Each sensing capacitor 520 can be an equivalent capacitor of one corresponding sensing line 510. The signal processing unit 580 is electrically connected to the first differential amplifiers 550 and the second differential amplifiers 551 for receiving a plurality of first touch readout signals and a plurality of second touch readout signals. The signal processing unit 580 performs analog/digital operations on the first and second touch readout signals for generating a plurality of digital readout signals. Furthermore, the signal processing unit 580 performs logic operations and touch position analyzing operations on the digital readout signals for providing at least one touch position signal Spos. The memory unit 590, electrically connected to the signal processing unit 580, is utilized for storing the digital readout signals. Referring to FIG. 5, it is obvious that the circuit structure of the touch panel device 500 is constructed based on a plurality of sensing modules, each sensing module having four sensing capacitors 520 together with corresponding first through fourth switches 541-544 and corresponding first and second differential amplifier 550, 551. For that reason, the circuit coupling relationship and functional operation of the touch panel device 500 are detailed based on a sensing module 560 shown in FIG. 5 as the followings.

The first differential amplifier Diff_i1 comprises a first input end electrically connected to the sensing capacitor Cs_n, a second input end electrically connected to the first switch Sw1 and the second switch Sw2, and an output end for outputting a corresponding touch readout signal to the signal processing unit 580. In one embodiment, the first and second input ends of the first differential amplifier Diff_i1 are positive and negative input ends respectively. The second differential amplifier Diff_i2 comprises a first input end electrically connected to the third switch Sw3 and the fourth switch Sw4, a second input end electrically connected to the sensing capacitor Cs_n+3, and an output end for outputting a corresponding touch readout signal to the signal processing unit 580. In one embodiment, the first and second input ends of the second differential amplifier Diff_i2 are positive and negative input ends respectively.

The first switch Sw1 comprises a first end electrically connected to the sensing capacitor Cs_n+1 and a second end electrically connected to the second input end of the first differential amplifier Diff_i1. The second switch Sw2 comprises a first end electrically connected to the sensing capacitor Cs_n+2 and a second end electrically connected to the second input end of the first differential amplifier Diff_i1. The third switch Sw3 comprises a first end electrically connected to the sensing capacitor Cs_n+1 and a second end electrically connected to the first input end of the second differential amplifier Diff_i2. The fourth switch Sw4 comprises a first end electrically connected to the sensing capacitor Cs_n+2 and a second end electrically connected to the first input end of the second differential amplifier Diff_i2. The sensing capacitor Cs_n+1 and the sensing capacitor Cs_n are adjacent or spaced out at least one sensing capacitor 520. The sensing capacitor Cs_n+3 and the sensing capacitor Cs_n+2 are adjacent or spaced out at least one sensing capacitor 520. The sensing capacitor Cs_n+2 and the sensing capacitor Cs_n+1 are adjacent or spaced out at least one sensing capacitor 520.

With the above in mind, it is obvious that the first differential amplifier Diff_i1 is employed to generate a corresponding touch readout signal through performing a differential amplification operation on the capacitor voltages of either the sensing capacitors Cs_n, Cs_n+1 or the sensing capacitors Cs_n, Cs_n+2. The second differential amplifier Diff_i2 is employed to generate a corresponding touch readout signal through performing a differential amplification operation on the capacitor voltages of either the sensing capacitors Cs_n+3, Cs_n+2 or the sensing capacitors Cs_n+3, Cs_n+1.

When the touch panel device 500 is operating in a first sense period, the first switch Sw1 is turned on and the second switch Sw2, the third switch Sw3 and the fourth switch Sw4 are turned off. In the meantime, the first differential amplifier Diff_i1 is utilized for generating a first touch readout signal through performing a differential amplification operation on the capacitor voltages of the sensing capacitors Cs_n, Cs_n+1. Thereafter, the signal processing unit 580 performs an analog/digital conversion operation on the first touch readout signal for generating a first digital readout signal. The first digital readout signal is then stored in the memory unit 590.

When the touch panel device 500 is operating in a second sense period, the fourth switch Sw4 is turned on and the first switch Sw1, the second switch Sw2 and the third switch Sw3 are turned off. In the meantime, the second differential amplifier Diff_i2 is utilized for generating a second touch readout signal through performing a differential amplification operation on the capacitor voltages of the sensing capacitors Cs_n+2, Cs_n+3. Thereafter, the signal processing unit 580 performs an analog/digital conversion operation on the second touch readout signal for generating a second digital readout signal. The second digital readout signal is then stored in the memory unit 590.

When the touch panel device 500 is operating in a third sense period, the second switch Sw2 is turned on and the first switch Sw1, the third switch Sw3 and the fourth switch Sw4 are turned off. In the meantime, the first differential amplifier Diff_i1 is utilized for generating a third touch readout signal through performing a differential amplification operation on the capacitor voltages of the sensing capacitors Cs_n, Cs_n+2. Thereafter, the signal processing unit 580 performs an analog/digital conversion operation on the third touch readout signal for generating a third digital readout signal. The third digital readout signal is then stored in the memory unit 590.

When the touch panel device 500 is operating in a fourth sense period, the third switch Sw3 is turned on and the first switch Sw1, the second switch Sw2 and the fourth switch Sw4 are turned off. In the meantime, the second differential amplifier Diff_i2 is utilized for generating a fourth touch readout signal through performing a differential amplification operation on the capacitor voltages of the sensing capacitors Cs_n+1, Cs_n+3. Thereafter, the signal processing unit 580 performs an analog/digital conversion operation on the fourth touch readout signal for generating a fourth digital readout signal. The fourth digital readout signal is then stored in the memory unit 590.

When each of the sensing modules in the touch panel device 500 completes the operations of the aforementioned first through fourth sense periods, all the digital readout signals corresponding to the touch panel 501 are therefore stored in the memory unit 590. During each sense period, it is noted that the sensing lines 510, which are not required to deliver sensing signals for generating touch readout signals, can be grounded or electrically connected to a reference level. Thereafter, the signal processing unit 580 performs a touch position analyzing operation on the digital readout signals for providing at least one touch position signal Spos.

Continue referring to FIG. 5, when the panel positions 571, 572 of the touch panel 501 are touched simultaneously, i.e. for a multi-point touch event, although the first readout signal generated during the first sense period cannot indicate the touch event occurring to the panel position 571, the third readout signal generated during the third sense period is able to indicate the touch event occurring to the panel position 571. Alternatively, when the panel positions 571, 573 of the touch panel 501 are touched simultaneously, i.e. for another multi-point touch event, although the third readout signal generated during the third sense period cannot indicate the touch event occurring to the panel position 571, the first readout signal generated during the first sense period is able to indicate the touch event occurring to the panel position 571. Consequently, by means of an OR operation performed by the signal processing unit 580, the touch panel device 500 is able to successfully detect a variety of touch events occurring to the panel position 571, for significantly enhancing touch sensitivity.

Figure 6:
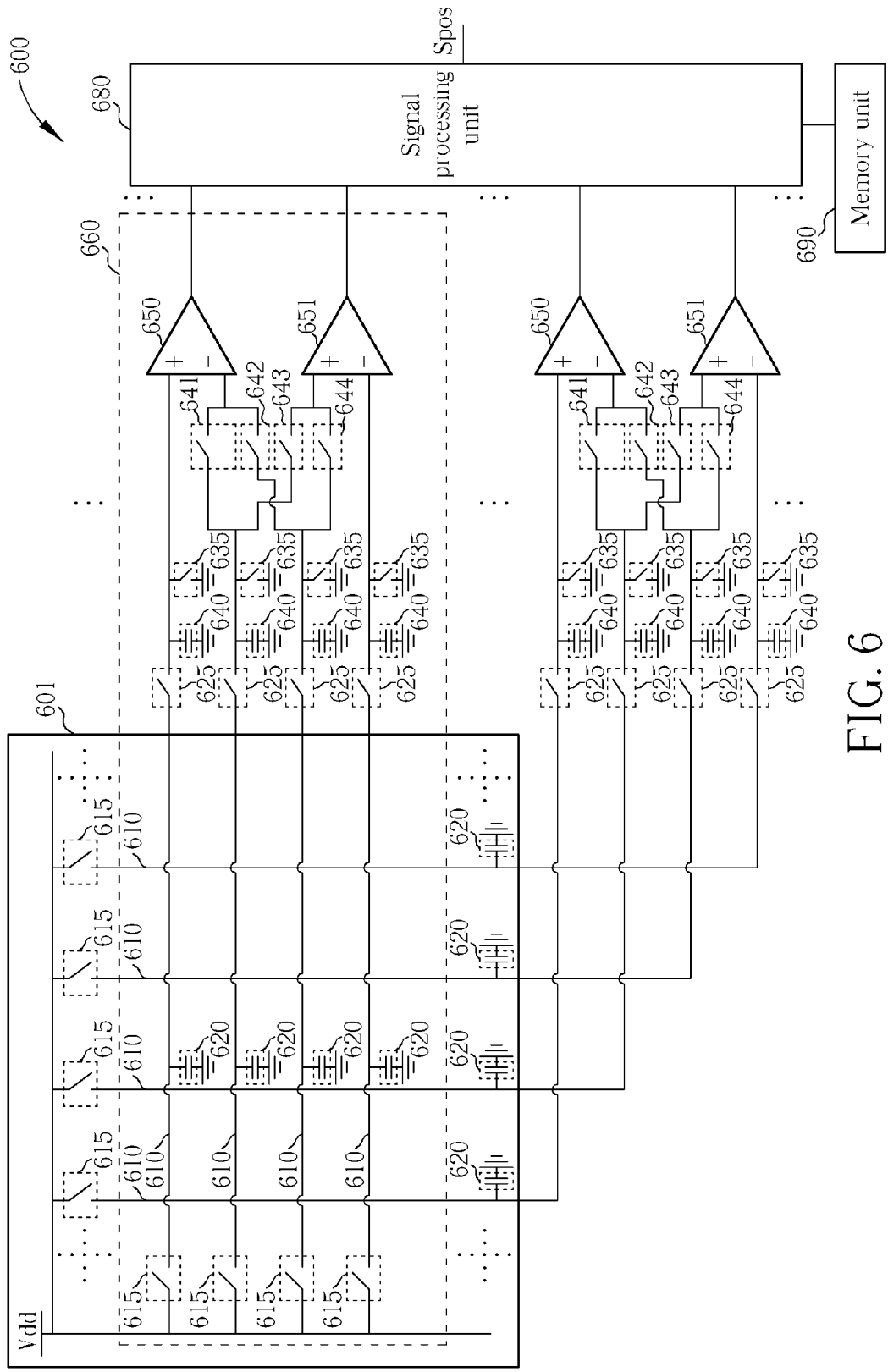
FIG. 6 is a structural diagram schematically showing a touch panel device in accordance with a fourth embodiment of the present invention.

FIG. 6 is a structural diagram schematically showing a touch panel device 600 in accordance with a fourth embodiment of the present invention. As shown in FIG. 6, the touch panel device 600 comprises a touch panel 601, a plurality of sensing lines 610, a plurality of sensing capacitors 620, a plurality of first switches 615, a plurality of second switches 625, a plurality of storage capacitors 640, a plurality of third switches 635, a plurality of fourth switches 641, a plurality of fifth switches 642, a plurality of sixth switches 643, a plurality of seventh switches 644, a plurality of first differential amplifiers 650, a plurality of second differential amplifiers 651, a signal processing unit 680, and a memory unit 690. The sensing lines 610 and the sensing capacitors 620 are disposed in the touch panel 601. Each sensing capacitor 620 can be an equivalent capacitor of one corresponding sensing line 610. The functionalities of the signal processing unit 680 and the memory unit 690 are identical to those of the signal processing unit 580 and the memory unit 590 shown in FIG. 5. The circuit structure of the touch panel device 600 is also constructed based on a plurality of sensing modules. For instance, the sensing module 660 of the touch panel device 600 comprises four sensing capacitors 620 together with corresponding first through third switches 615, 625, 635, corresponding four storage capacitors 640, corresponding fourth through seventh switches 641~644, and corresponding first and second differential amplifiers 650, 651. The circuit structure of the sensing module 660 is similar to that of the sensing module 560 shown in FIG. 5, differing in that the first through third switches 615, 625, 635 and the storage capacitors 640 are further added. The functionalities of the fourth through seventh switches 641~644 are identical to those of the first through fourth switches 541~544 shown in FIG. 5. The circuit operations regarding the sensing module 660 of the touch panel device 600 are briefed as the followings.

When the sensing module 660 is operating in a sense period, each first switch 615 and one corresponding the second switch 625, electrically connected to each other via one corresponding sensing line 610 required for delivering charges to generate a touch readout signal in the sense period, are periodically turned on alternately so that one corresponding storage capacitor 640 is able to periodically accumulate the charges transferred from one corresponding sensing capacitor 620. During each sense period, it is noted that the sensing lines 610, which are not required to deliver charges for generating touch readout signals, can be grounded or electrically connected to a reference level. When the sensing module 660 is operating in a reset period, all the third switches 635 thereof are turned on for releasing the charges stored in corresponding storage and sensing capacitors 640, 620, or for releasing only the charges stored in corresponding storage capacitors 640. In view of that, the functionalities of the first through third switches 615, 625, 635 and the storage capacitors 640 are identical to those of the first through third switches 215, 225, 235 and the storage capacitors 240 shown in FIG. 2. With the above in mind, it is obvious that the functional operation of the touch panel device 600 are equivalent to a combination of functional operations regarding the touch panel device 200 and the touch panel device 500, and for the sake of brevity, further similar discussion thereof is omitted.

Figure 7:
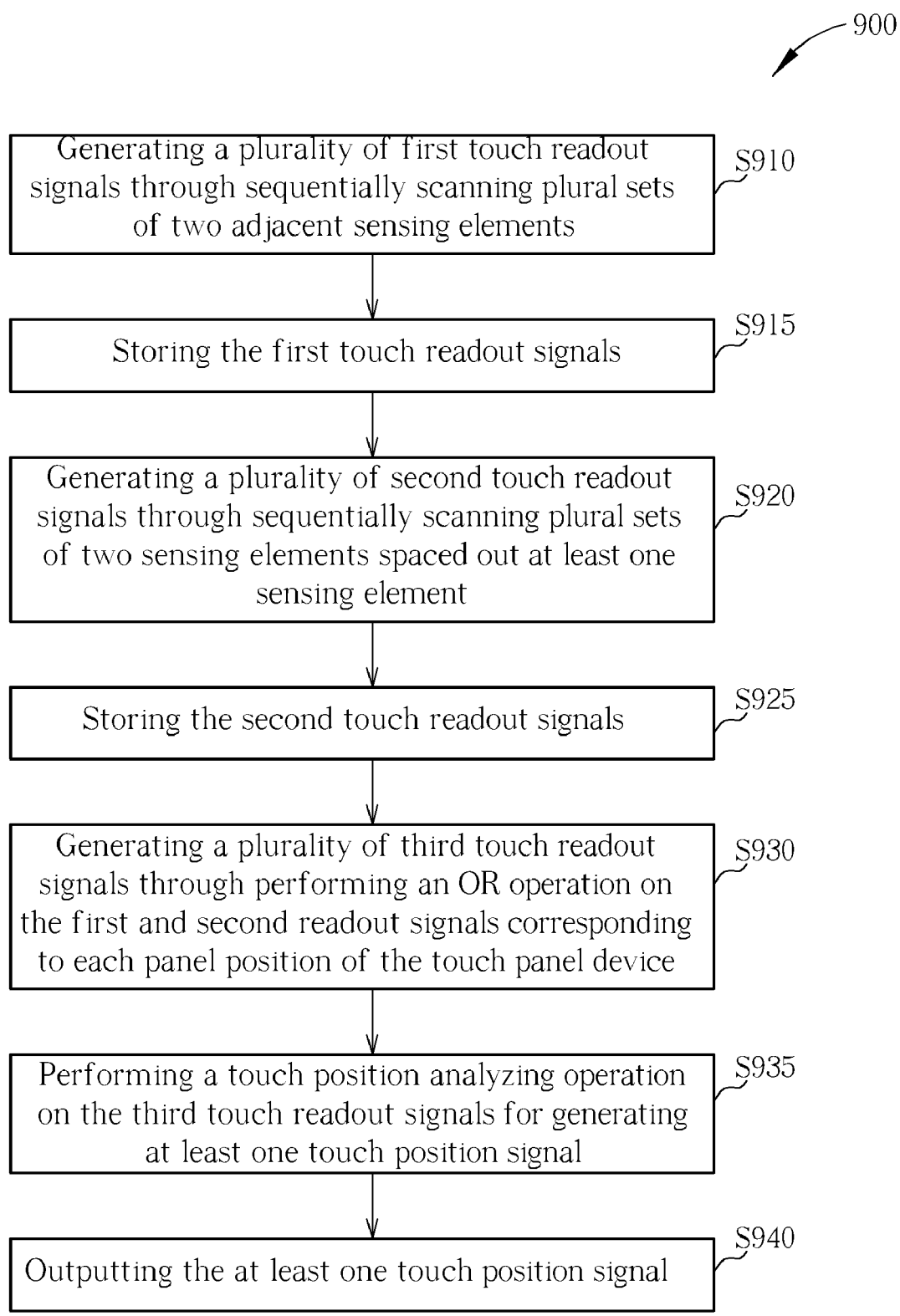
FIG. 7 is a flowchart depicting a touch positioning method for use in a touch panel device according to the present invention.

FIG. 7 is a flowchart depicting a touch positioning method for use in a touch panel device according to the present invention. The touch panel device includes a plurality of sensing elements disposed at plural panel positions. The sensing elements can be the aforementioned sensing capacitors. As shown in FIG. 7, the touch positioning method illustrated in the flow 900 comprises the following steps:

Step S910: generating a plurality of first touch readout signals through sequentially scanning plural sets of two adjacent sensing elements;

Step S915: storing the first touch readout signals;

Step S920: generating a plurality of second touch readout signals through sequentially scanning plural sets of two sensing elements spaced out at least one sensing element;

Step S925: storing the second touch readout signals;

Step S930: generating a plurality of third touch readout signals through performing an OR operation on the first and second readout signals corresponding to each panel position of the touch panel device;

Step S935: performing a touch position analyzing operation on the third touch readout signals for generating at least one touch position signal; and Step S940: outputting the at least one touch position signal.

Regarding the flow 900 of the touch positioning method, the step S910 of generating the first touch readout signals comprises performing a differential amplification operation on the sensing signals of each set of two adjacent sensing elements for generating one corresponding first touch readout signal. The step S920 of generating the second touch readout signals comprises performing a differential amplification operation on the sensing signals of each set of two sensing elements spaced out at least one sensing element for generating one corresponding second touch readout signal. Consequently, a variety of different touch events occurring to each panel position can be successfully detected based on corresponding first and second touch readout signals. That is, the touch event corresponding to each panel position can be accurately detected even for an occurrence of multi-point touch. For that reason, the touch positioning method of the present invention can be employed to significantly enhance the touch sensitivity of the touch panel device.

In conclusion, according to the present invention, the touch panel device and the touch positioning method thereof are capable of enhancing touch sensitivity through performing an operation of periodically transferring the charges of capacitors, or capable of providing touch position signals with high sensitivity under various kinds of touch events through performing an OR operation on two touch readout signals generated based on different sensing element combinations regarding each panel touch position.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A touch panel device comprising:
a touch panel;
a first sensing capacitor disposed in the touch panel;

a first switch, electrically connected to the first sensing capacitor, for controlling an electrical connection between the first sensing capacitor and a power source;

s second switch, electrically connected to the first sensing capacitor;

a first storage capacitor, electrically connected to the second switch, for accumulating charges transferred from the first sensing capacitor so as to generate a first voltage when the second switch is turned on;

a third switch, electrically connected to the first storage capacitor, for controlling an operation of discharging the charges accumulated in the first storage capacitor;

a second sensing capacitor disposed in the touch panel;

a fourth switch, electrically connected to the second sensing capacitor, for controlling an electrical connection between the second sensing capacitor and the power source;

s fifth switch, electrically connected to the second sensing capacitor;

a second storage capacitor, electrically connected to the fifth switch, for accumulating charges transferred from the second sensing capacitor so as to generate a second voltage when the fifth switch is turned on;

a sixth switch, electrically connected to the second storage capacitor, for controlling an operation of discharging the charges accumulated in the second storage capacitor; and a differential amplifier, electrically connected to the first storage capacitor and the second storage capacitor, for generating a touch readout signal through performing a differential amplification operation on the first and second voltages.

2. The touch panel device of claim 1, wherein:
the first switch and the second switch are working based on an alternating turn-on operation; and
the fourth switch and the fifth switch are working based on an alternating turn-on operation.

3. The touch panel device of claim 1, wherein:
the first switch and the second switch are periodically turned on alternately during a sense period so that the first storage capacitor accumulates the charges periodically transferred from the first sensing capacitor; and
the fourth switch and the fifth switch are periodically turned on alternately during the sense period so that the second storage capacitor accumulates the charges periodically transferred from the second sensing capacitor.

4. The touch panel device of claim 1, wherein:
the third switch is turned on during a reset period for discharging the charges accumulated in the first storage capacitor; and
the sixth switch is turned on during the reset period for discharging the charges accumulated in the second storage capacitor.

5. The touch panel device of claim 1, wherein:
the second switch and the third switch are turned on during a reset period for discharging the charges stored in the first sensing capacitor and the first storage capacitor; and
the fifth switch and the sixth switch are turned on during the reset period for discharging the charges stored in the second sensing capacitor and the second storage capacitor.

6. The touch panel device of claim 1, further comprising:
a third sensing capacitor disposed in the touch panel;
a seventh switch, electrically connected to the third sensing capacitor, for controlling an electrical connection between the third sensing capacitor and the power source;
a fourth sensing capacitor disposed in the touch panel;
an eighth switch, electrically connected to the fourth sensing capacitor, for controlling an electrical connection between the fourth sensing capacitor and the power source; and
a multiplexer comprising a first input end electrically connected to the first sensing capacitor, a second input end electrically connected to the second sensing capacitor, a third input end electrically connected to the third sensing capacitor, a fourth input end electrically connected to the fourth sensing capacitor, a first output end electrically connected to the second switch, and a second output end electrically connected to the fifth switch, wherein the charges stored in the first or third sensing capacitor are transferred to the first storage capacitor via the first output end of the multiplexer when the second switch is turned on, and the charges stored in the second or fourth sensing capacitor are transferred to the second storage capacitor via the second output end of the multiplexer when the fifth switch is turned on.

7. The touch panel device of claim 6, wherein the seventh switch and the second switch are periodically turned on alternately during a sense period so that the first storage capacitor periodically accumulates the charges transferred from the third sensing capacitor when the multiplexer electrically connects the third sensing capacitor and the second switch.

8. The touch panel device of claim 6, wherein the eighth switch and the fifth switch are periodically turned on alternately during a sense period so that the second storage capacitor periodically accumulates the charges transferred from the fourth sensing capacitor when the multiplexer electrically connects the fourth sensing capacitor and the fifth switch.

9. The touch panel device of claim 6, wherein the second switch and the third switch are turned on during a reset period for discharging the charges stored in the third sensing capacitor and the first storage capacitor when the multiplexer electrically connects the third sensing capacitor and the second switch.

10. The touch panel device of claim 6, wherein the fifth switch and the sixth switch are turned on during a reset period for discharging the charges stored in the fourth sensing capacitor and the second storage capacitor when the multiplexer electrically connects the fourth sensing capacitor and the fifth switch.

11. The touch panel device of claim 6, wherein the second sensing capacitor is adjacent to the first sensing capacitor.

12. The touch panel device of claim 6, wherein the fourth sensing capacitor is adjacent to the third sensing capacitor.

13. The touch panel device of claim 1, further comprising:
a signal processing unit, electrically connected to the differential amplifier, for generating a plurality of digital readout signals through performing analog/digital conversion operations on the touch readout signals generated during different sense periods, and for generating at least one touch position signal according to the digital readout signals; and
a memory unit, electrically connected to the signal processing unit, for storing the digital readout signals.

14. A touch panel device comprising:
a touch panel;
a first sensing capacitor disposed in the touch panel;
a second sensing capacitor disposed in the touch panel;
a third sensing capacitor disposed in the touch panel;
a fourth sensing capacitor disposed in the touch panel;

a first differential amplifier comprising a first input end electrically connected to the first sensing capacitor, a second input end, and an output end for outputting a first touch readout signal;

a second differential amplifier comprising a first input end, a second input end electrically connected to the fourth sensing capacitor, and an output end for outputting a second touch readout signal;

a first switch comprising a first end electrically connected to the second sensing capacitor and a second end electrically connected to the second input end of the first differential amplifier;

a second switch comprising a first end electrically connected to the third sensing capacitor and a second end electrically connected to the second input end of the first differential amplifier;

a third switch comprising a first end electrically connected to the second sensing capacitor and a second end electrically connected to the first input end of the second differential amplifier; and a fourth switch comprising a first end electrically connected to the third sensing capacitor and a second end electrically connected to the first input end of the second differential amplifier.

15. The touch panel device of claim 14, further comprising:

a fifth switch, electrically connected to the first sensing capacitor, for controlling an electrical connection between the first sensing capacitor and a power source;

a sixth switch electrically connected between the first sensing capacitor and the first input end of the first differential amplifier;

a first storage capacitor, electrically connected to the sixth switch, for accumulating charges transferred from the first sensing capacitor when the sixth switch is turned on;

a seventh switch, electrically connected to the first storage capacitor, for controlling an operation of discharging the charges accumulated in the first storage capacitor;

an eighth switch, electrically connected to the second sensing capacitor, for controlling an electrical connection between the second sensing capacitor and the power source;

a ninth switch comprising a first end electrically connected to the second sensing capacitor and a second end electrically connected to the first ends of the first and third switches;

a second storage capacitor, electrically connected to the second end of the ninth switch, for accumulating charges transferred from the second sensing capacitor when the ninth switch is turned on;

a tenth switch, electrically connected to the second storage capacitor, for controlling an operation of discharging the charges accumulated in the second storage capacitor;

an eleventh switch, electrically connected to the third sensing capacitor, for controlling an electrical connection between the third sensing capacitor and the power source;

a twelfth switch comprising a first end electrically connected to the third sensing capacitor and a second end electrically connected to the first ends of the second and fourth switches;

a third storage capacitor, electrically connected to the second end of the twelfth switch, for accumulating charges transferred from the third sensing capacitor when the twelfth switch is turned on;

a thirteenth switch, electrically connected to the third storage capacitor, for controlling an operation of discharging the charges accumulated in the third storage capacitor;

a fourteenth switch, electrically connected to the fourth sensing capacitor, for controlling an electrical connection between the fourth sensing capacitor and the power source;

a fifteenth switch electrically connected between the fourth sensing capacitor and the second input end of the second differential amplifier;

a fourth storage capacitor, electrically connected to the fifteenth switch, for accumulating charges transferred from the fourth sensing capacitor when the fifteenth switch is turned on; and a sixteenth switch, electrically connected to the fourth storage capacitor, for controlling an operation of discharging the charges accumulated in the fourth storage capacitor.

16. The touch panel device of claim 14, further comprising:

a signal processing unit, electrically connected to the first differential amplifier and the second differential amplifier, for generating a plurality of digital readout signals through performing analog/digital conversion operations on the first and second touch readout signals generated during different sense periods, and for generating at least one touch position signal according to the digital readout signals; and a memory unit, electrically connected to the signal processing unit, for storing the digital readout signals.

17. The touch panel device of claim 14, wherein the second sensing capacitor is adjacent to the first sensing capacitor.

18. The touch panel device of claim 14, wherein the fourth sensing capacitor is adjacent to the third sensing capacitor.

19. The touch panel device of claim 14, wherein the third sensing capacitor is adjacent to the second sensing capacitor.

20. A touch positioning method for use in a touch panel device, the touch panel device having plural sensing elements disposed at plural panel positions, the touch positioning method comprising:

generating a plurality of first touch readout signals through sequentially scanning plural sets of two adjacent sensing elements;

generating a plurality of second touch readout signals through sequentially scanning plural sets of two sensing elements spaced out at least one sensing element;

generating a plurality of third touch readout signals through performing an OR operation on the first and second readout signals corresponding to each panel position of the touch panel device;

performing a touch position analyzing operation on the third touch readout signals for generating at least one touch position signal; and outputting the at least one touch position signal.

21. The touch positioning method of claim 20, further comprising:

storing the first touch readout signals; and
storing the second touch readout signals.

* * * * *